United States Patent
Larson et al.

(10) Patent No.: US 9,189,283 B2
(45) Date of Patent: Nov. 17, 2015

(54) TASK LAUNCHING ON HARDWARE RESOURCE FOR CLIENT

(75) Inventors: Bradley R. Larson, Meridian, ID (US); Mary T. Prenn, Star, ID (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 390 days.

(21) Appl. No.: 13/040,128

(22) Filed: Mar. 3, 2011

(65) Prior Publication Data
US 2012/0227052 A1   Sep. 6, 2012

(51) Int. Cl.
 G06F 9/46  (2006.01)
 G06F 9/50  (2006.01)

(52) U.S. Cl.
 CPC .................................. G06F 9/5044 (2013.01)

(58) Field of Classification Search
 None
 See application file for complete search history.

(56) References Cited

U.S. PATENT DOCUMENTS

| | | | |
|---|---|---|---|
| 4,027,290 A | 5/1977 | Subrizi et al. | |
| 4,679,169 A | 7/1987 | de la Salle et al. | |
| 5,070,447 A | 12/1991 | Koyama | |
| 5,410,708 A | 4/1995 | Miyamori | |
| 5,539,883 A | 7/1996 | Allon et al. | |
| 5,551,044 A | 8/1996 | Shah et al. | |
| 5,564,117 A | 10/1996 | Lentz et al. | |
| 5,634,135 A | 5/1997 | Hollander | |
| 5,701,482 A | 12/1997 | Harrison et al. | |
| 5,721,921 A * | 2/1998 | Kessler et al. | 718/102 |
| 5,812,858 A | 9/1998 | Nookala et al. | |
| 5,901,321 A | 5/1999 | Kim et al. | |
| 6,081,867 A | 6/2000 | Cox | |
| 6,256,659 B1 * | 7/2001 | McLain et al. | 718/100 |
| 6,449,675 B1 | 9/2002 | Moyer et al. | |
| 6,539,448 B1 | 3/2003 | Deng | |
| 6,845,419 B1 | 1/2005 | Moyer | |
| 7,206,924 B2 | 4/2007 | Boles et al. | |

(Continued)

FOREIGN PATENT DOCUMENTS

| | | |
|---|---|---|
| EP | 0469543 | 2/1992 |
| JP | 1214939 | 8/1989 |

(Continued)

OTHER PUBLICATIONS

E El-Araby et al., "Space and time sharing of reconfigurable hardware for accelerated parallel processing," Proceedings of the 6th International Symposium on Applied Reconfigurable Computing (ARC 2010), Bangkok, Thailand, Mar. 2010.

(Continued)

*Primary Examiner* — Tammy Lee
(74) *Attorney, Agent, or Firm* — Michael A. Dryja

(57) ABSTRACT

A system includes a client management component, a monitor component, and a hardware resource component, each of which is implemented in hardware. The client management component chooses a selected client from one or more clients for which a given task is to be fulfilled by a selected hardware resource of one or more hardware resources. The monitor component receives the given task and an identifier of the selected client from the client management component and monitors completion of the given task for the selected client by the selected hardware resource. The hardware resource management receives the given task from the monitor component, chooses the selected hardware resource that is to fulfill the given task, and launches the given task on the selected hardware resource.

10 Claims, 3 Drawing Sheets

(56) References Cited

U.S. PATENT DOCUMENTS

| | | | |
|---|---|---|---|
| 7,991,909 B1* | 8/2011 | Schumacher et al. | 709/237 |
| 8,271,980 B2* | 9/2012 | Jackson | 718/100 |
| 8,271,987 B1* | 9/2012 | Willeford et al. | 718/104 |
| 8,438,579 B2* | 5/2013 | Molotsi | 719/318 |
| 2004/0153650 A1* | 8/2004 | Hillmer | 713/176 |
| 2005/0055697 A1* | 3/2005 | Buco et al. | 718/105 |
| 2005/0193157 A1 | 9/2005 | Kwon et al. | |
| 2007/0124363 A1* | 5/2007 | Lurie et al. | 709/202 |
| 2007/0300223 A1 | 12/2007 | Liu | |
| 2008/0091867 A1 | 4/2008 | Plondke et al. | |
| 2008/0098207 A1* | 4/2008 | Reid et al. | 712/227 |
| 2008/0189716 A1* | 8/2008 | Nakahara | 718/105 |
| 2009/0037926 A1 | 2/2009 | Dinda et al. | |
| 2009/0049443 A1* | 2/2009 | Powers et al. | 718/100 |
| 2009/0210660 A1 | 8/2009 | Webber | |
| 2009/0248935 A1 | 10/2009 | Ehrlich et al. | |
| 2010/0199278 A1* | 8/2010 | Tomita | 718/100 |
| 2011/0041127 A1* | 2/2011 | Kohlenz et al. | 718/100 |
| 2011/0161955 A1* | 6/2011 | Woller et al. | 718/1 |
| 2012/0226893 A1 | 9/2012 | Prenn et al. | |
| 2012/0227052 A1 | 9/2012 | Larson et al. | |

FOREIGN PATENT DOCUMENTS

| | | |
|---|---|---|
| JP | 2009163658 A | 7/2009 |
| JP | 2009288978 | 12/2009 |

OTHER PUBLICATIONS

M. Potkonjak et al., "Cost optimization in ASIC implementation of periodic hard-real time systems using behavioral synthesis techniques," ICCAD '95 Proceedings of the 1995 IEEE/ACM international conference on Computer-aided design.

* cited by examiner

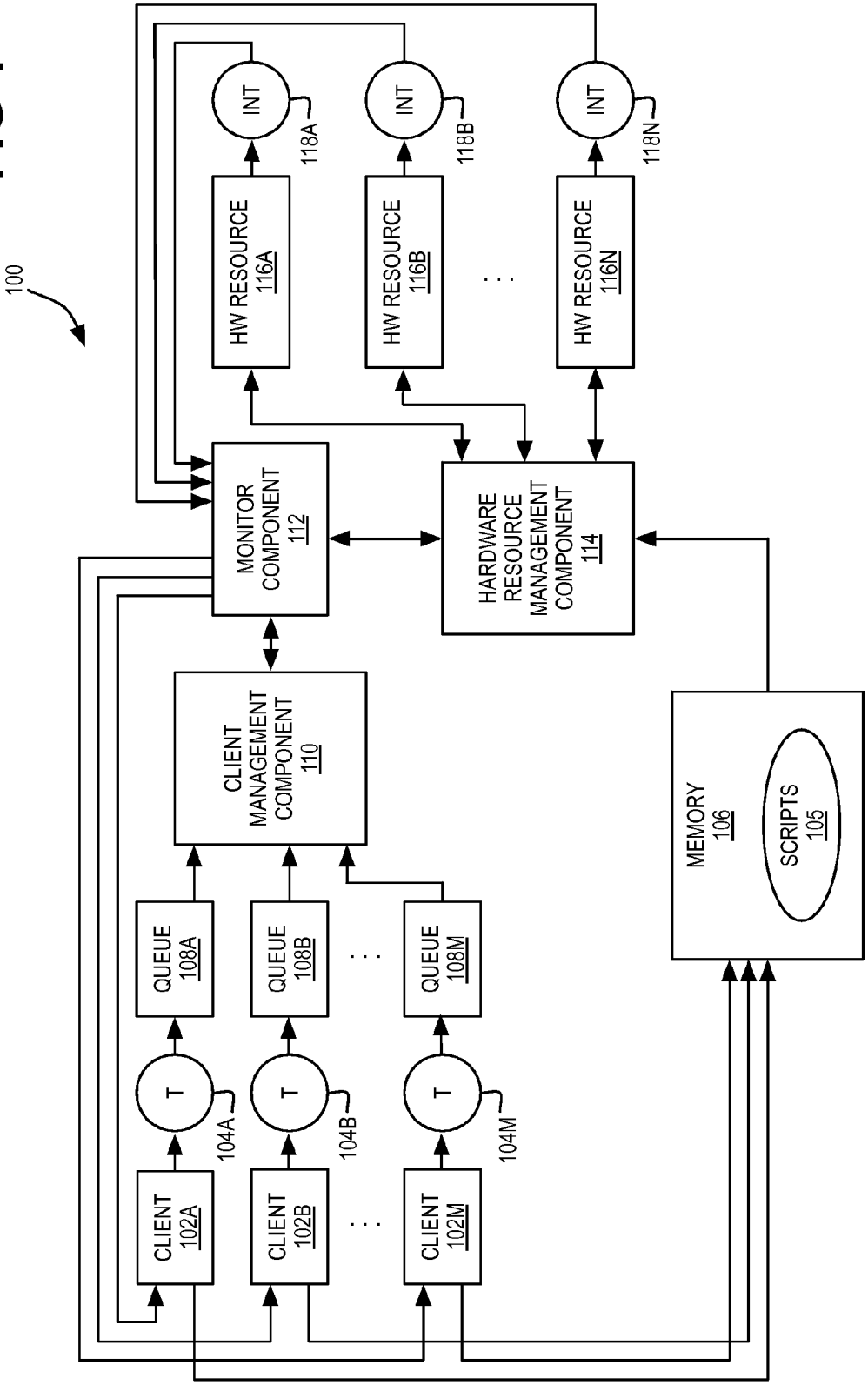

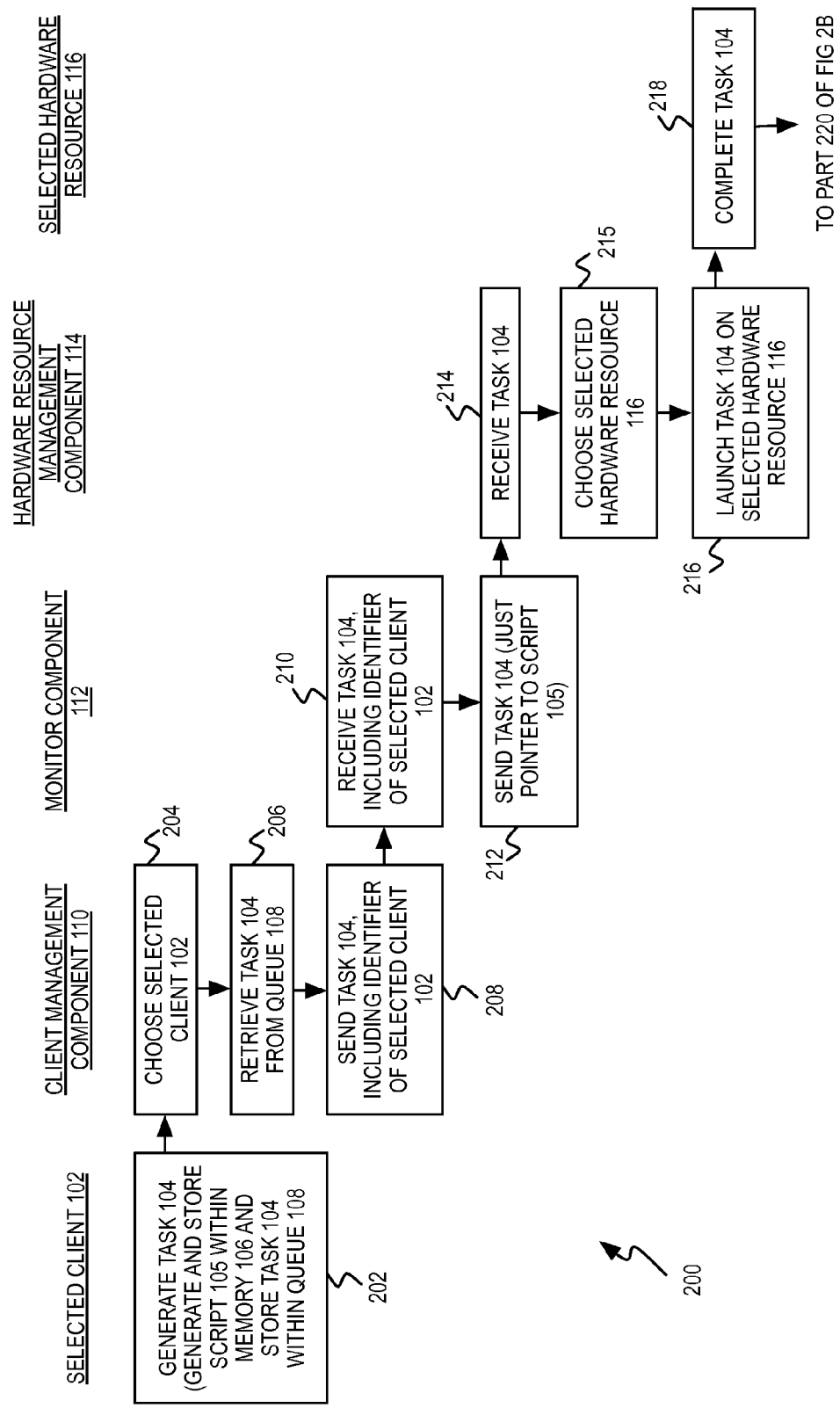

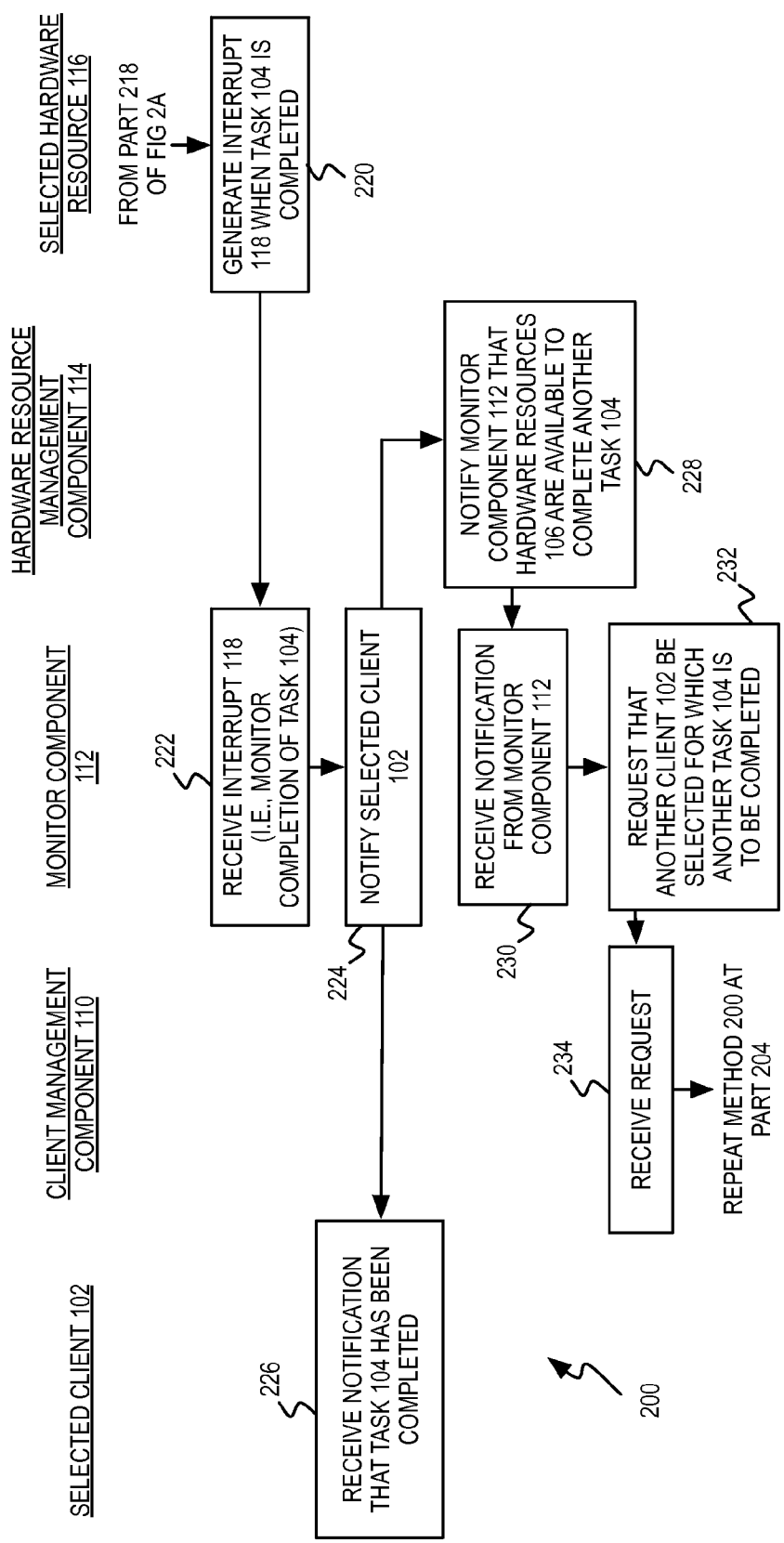

TASK LAUNCHING ON HARDWARE RESOURCE FOR CLIENT

BACKGROUND

Hardware devices frequently include hardware resources and clients, the latter which may be software clients or hardware clients. Hardware resources can be conceptualized as those parts of a hardware device that are to perform processing, and thus which may be considered as "producers." By comparison, clients can be conceptualized as generating tasks that are to be performed, and which may be considered as "consumers." A client may thus generate a task that a hardware resource is to fulfill or complete.

BRIEF DESCRIPTION OF THE DRAWINGS

FIG. 1 is a diagram of an example system in which tasks generated by multiple clients can be completed by multiple hardware resources.

FIGS. 2A and 2B are flowcharts of an example method in which tasks generated by multiple clients can be completed by multiple hardware resources.

DETAILED DESCRIPTION

As noted in the background section, a software or a hardware client may generate a task that is to be fulfilled or completed by a hardware resource of a hardware device. There may be more than one client that is generating tasks for completion. Furthermore, there may be more than one hardware resource that can complete these tasks.

A rudimentary approach to completing tasks generated by clients on hardware resources is to assign each client a corresponding hardware resource. The tasks generated by a particular client are therefore completed by its corresponding hardware resource. However, this approach is disadvantageous. Some clients may not utilize their corresponding hardware resources much, and other clients may generate more tasks than their corresponding hardware resources can timely complete.

For multiple clients to share multiple hardware resources—or for one client to share multiple hardware resources or for multiple clients to share one hardware resource—conventionally the clients, the hardware resources, or both, have to be redesigned for such sharing to occur. The clients may be software clients or hardware clients. Example of the former include, for instance, software processes, which may be parts of different operating systems, such as the webOS™ platform available from Palm, Inc., of Sunnyvale, Calif.; and, the Windows CE™ operating system available from Microsoft Corp., of Redmond, Wash. Still other examples of operating systems include the OS21™ operating system available from STMicroelectronics, of Phoenix, Ariz., and versions of the LINUX® operating system, which is a registered trademark of Linus Torvalds.

Deploying this type of sharing within a system can thus be time-consuming and expensive, due to their having to be redesigned for such sharing to occur. Further, different client instances may be unaware of one another, which also makes sharing difficult. While a computer program may be developed that when executed by a processor provides for sharing, some types of systems do not have powerful processors or any processors at all, such that upgrading the processor to a more powerful one or adding a processor is expensive in cost-sensitive environments.

Disclosed herein is a technique for sharing multiple hardware resources by multiple clients—or for one client to share multiple hardware resources or for multiple clients to share one hardware resource—that overcomes these shortfalls. A system includes a client management component, a monitor component, and a hardware resource component, each of which is implemented in hardware. In at least some scenarios, none of these components is implemented as a computer program that is executed by a processor. As such, a system does not have to have a processor to implement the components, and a system that does have a processor does not have to be upgraded with a more powerful processor to implement the components.

The client management component chooses a selected client from one or more clients for which a given task is to be fulfilled by a selected hardware resource of one or more hardware resources. The monitor component receives the given task and an identifier of the selected client from the client management component, and monitors completion of the given task for the selected client by the selected hardware resource. The hardware resource management component receives the given task from the monitor component, chooses the selected hardware resource that is to fulfill or complete the given task, and launches the given task on the selected hardware resource.

Neither the clients nor the hardware resources have to be redesigned to any substantial extent, if at all, to permit sharing of the latter by the former. The clients provide their tasks to be completed to the client management component, such as by placing the tasks within queues corresponding to the clients; a task may include an identifier of the client for which the task is to be completed and a memory pointer to a script for the task. The hardware resources fulfill the tasks as governed by the hardware resource component. The monitor component monitors completion of the tasks by the hardware resources, such as by trapping interrupts generated by the resources upon task completion so that the clients can be informed when their tasks have been completed.

FIG. 1 shows an example system 100. The system 100 can include one or more clients 102A, 102B, . . . , 102M, which are collectively referred to as the clients 102. The clients 102 may be software clients, such as processes executing on a processor, or hardware clients, such as those implemented within or as a part of discrete hardware components like application-specific integrated circuits (ASICs) and field-gate programmable arrays (FPGAs).

The clients 102 generate corresponding tasks 104A, 104B, . . . , 104M, which are collectively referred to as the tasks 104, to be completed. Each client 102 can generate one or more tasks 104. A task 104 can include an identifier of the client 102 that generated the task 104, such as a process identifier, as well as a pointer to a corresponding script 105 that corresponds to the task 104. A script 105 is a collection of instructions that when executed realizes fulfillment of the task 104 to which it corresponds, a concrete example of which is provided later in the detailed description.

The system 100 can include memory 106, such as hardware memory like random-access memory. The clients 102 store the scripts 105 in the memory 106. For instance, when a client 102 generates a task 104, the client 102 generates a script 105 corresponding to the task, and stores the script 105 within the memory 106. The task 104 itself includes a pointer to the location within the memory 106 at which the script 105 is stored, and an identifier of the client 102 that generated the task 104. The client 102 may instead of generating the script 105 point to a preexisting script 105 within the memory 106, as part of generating the task 104 in question.

The task 104 may further include a hardware resource type identifier to indicate the type of hardware resource 116 that is to fulfill the task 104. This is particularly useful where the hardware resources 116 are heterogeneous, and thus of different types. One type of hardware resource 116 may not be able to fulfill the same kind of task 104 as another hardware resource 116, for instance. However, if the hardware resources 116 are homogeneous, and thus of the same type, then a hardware resource type identifier may not have to be included as part of the task 104. The remainder of the detailed description presumes that the hardware resources 116 are homogeneous, but in fact they may be heterogeneous.

The system 100 can include queues 108A, 108B, . . . , 108M, which are collectively referred to as the queues 108. The queues 108 can be hardware queues, which are queues implemented directly in hardware without any software. Each queue 108 corresponds to one of the clients 102, such that each client 102 is assigned to one of the queues 108. Upon generating the tasks 104, the clients 102 store the tasks 104 in their corresponding queues 108.

The system 100 includes a client management component 110. The client management component 110 is implemented at least in hardware, such as implemented within or as a part of a discrete hardware component like an ASIC or an FPGA. In some implementations, the client management component 110 does not include software this is executed by a processor, and therefore is independent of and does not rely upon any such processor of the system 100.

The client management component 110 chooses a selected client 102 from the clients 102 for which a corresponding task 104 is to be completed next. The client management component 110 may be implemented as described in the pending patent application entitled "hardware controller to choose selected hardware entity and to execute instructions in relation to selected hardware entity," filed on Mar. 3, 2011, and assigned application Ser. No. 13/040,400. In this respect, the client management component 110 is the hardware controller described in the referenced patent application, and the clients 102 are the entities described in the referenced patent application.

Upon choosing a selected client 102, the client management component 110 retrieves and removes the corresponding task 104 from the queue 108 for the selected client 102. The task 104 that is removed from this queue 108 is the task 104 that is the oldest task 104 that the selected client 102 placed in the queue 108. Each queue 108 is thus a first-in, first-out (FIFO) queue.

The client management component 110 may be programmed by one or more parameters that together specify the priority of the clients 102 for selection purposes. As one example, the clients 102 may have a given order of priority. If two or more clients 102 have placed tasks 104 in their respective queues 108, then the component 110 may select the client 102 that has higher priority. However, the component 110 may then select the next higher priority client 102 that has placed a task 104 in its queue 108, instead of selecting an even higher priority client 102 that place a task 104 in its queue 108 later in time. In this way, clients 102 are not starved of processing even if they have relatively low priority.

The system 100 includes a monitor component 112. The monitor component 112 is implemented at least in hardware, such as within or as a part of a discrete hardware component like an ASIC or an FPGA. In some implementations, the monitor component 112 does not include software that is executed by a processor, and therefore is independent of and does not rely upon any such processor of the system 100.

The monitor component 112 receives the task 104 of the selected client 102 from the client management component 110. If the task 104 includes an identifier of the selected client 102 that generated the task 104, then the monitor component 112 inherently receives this identifier when receiving the task 104 from the client management component 110. Otherwise, the monitor component 112 also receives the identifier of the selected client 102, in addition to the task 104, from the client management component 110.

The system 100 includes a hardware resource management component 114. The hardware resource management component 114 is implemented at least in hardware, such as within or as a part of a discrete hardware component like an ASIC or an FPGA. In some implementations, the hardware resource management component 114 does not include any software that is executed by a processor, and therefore is independent of and does not rely upon any such processor of the system 100.

The hardware resource management component 114 receives the task 104 of the selected client 102 from the monitor component 112. The hardware resource management component 114 does not care about nor need knowledge of the identity of the selected client 102 itself. As such, if the task 104 does not include the identifier of the selected client 102, then the monitor component 112 does not send this identifier to the hardware resource management component 114. If the task 104 does include the identifier of the selected client 102, then the monitor component 112 may send just the pointer to the script 105 corresponding to the task 104 in question, and not the entire task 104 including the identifier of the selected client 102, to the hardware resource management component 114.

The system 100 can include one or more hardware resources 116A, 116B, . . . , 116N, which are collectively referred to as the hardware resources 116. The hardware resources 116 are implemented in hardware, and each hardware resource 116 may be implemented within or as a part of an ASIC, an FPGA, and so on. Each hardware resource 116 is able to perform processing. For example, the hardware resources 116 may be adapted to perform one particular type of processing at a much higher speed than a general-purpose processor could achieve. The hardware resources 116 may be identical to one another, and thus may be instantiations of the same type of hardware resource 116, as noted above.

The hardware resource management component 114 chooses a selected hardware resource 116 in relation to which the task 104 received from the monitor component 112 is to be completed. The hardware resource management component 114 may be implemented as described in the pending patent application entitled "hardware controller to choose selected hardware entity and to execute instructions in relation to selected hardware entity" that has been referenced above. In this respect, the hardware resource management component 114 is the hardware controller described in the referenced patent application, and the hardware resources 116 are the hardware entities described in the referenced patent application.

The hardware resource management component 114 launches the task 104 received from the monitor component 112 on the selected hardware resource 116. The hardware resource management component 114 may retrieve the script 105 corresponding to the task 104 in question from the memory 106, and execute the script 105 to cause the selected hardware resource 116 to fulfill the task 104. The selected hardware resource 116 then performs processing to complete this task 104. As such, it can be said that the task 104 is executed in relation to the selected hardware resource 116.

The hardware resource 116 does not know (or have to know) the identity of the selected client 102 that generated the task 104 to which the script 105 corresponds.

As a concrete example, the script 105 may indicate that given data is to be copied into a hardware resource 116, and that the hardware resource 116 is then to be launched to perform processing on this data. The hardware resource management component 114 therefor receives and performs the script 105. First, the component 114 performs, or causes to be performed, a copy operation to copy the relevant data into the hardware resource 116. Second, the component 114 then launches the hardware resource 116, such that the hardware resource 116 performs processing on the data that has been previously copied into the hardware resource 116.

The hardware resources 116 may notify the hardware resource management component 114 when they are available to process tasks 104. The hardware resource management component 114 can use this availability information to determine to which hardware resource 116 to send a task 104 for completion, as received from the monitor component 112. The hardware resources 116 also generate corresponding interrupts 118A, 118B, . . . , 118N, which are collectively referred to as the interrupts 118, when the hardware resources 116 have finished fulfillment of tasks 104.

The monitor component 112 receives the interrupts 118. The monitor component 112 may trap or intercept the interrupts 118 directly, such that the interrupts 118 are not initially received by any general-purpose processor of the system 100. The monitor component 112 correlates the interrupts 118 that have been received with the clients 102 that generated the tasks 104 that have been fulfilled by the hardware resources 116. For instance, the monitor component 112 may receive the mapping of tasks 104 to hardware resources 116 from the hardware resource management component 114, and correlate an interrupt 118 to a client 102 on this basis of this information. As such, it can be said that the monitor component 112 monitors completion of the tasks 104 by the hardware resources 118.

The monitor component 112 in this respect may be implemented as described in the pending patent application entitled "hardware interrupt processing circuit," filed on Mar. 3, 2011, and assigned application Ser. No. 13/040,082. The monitor component 112 thus can be the hardware controller 104 described in this reference patent application. The monitor component 112 may further include the hardware interrupt processing circuit 100 described in this referenced patent application. The hardware resources 116 correspond to the hardware resources 102 described in this referenced patent application.

Upon completion of a task 104 by one of the hardware resources 116, the monitor component 112 notifies the client 102 that generated the task 104. In this way, there is a feedback loop within the system 100. The clients 102 generate tasks 104 and store the tasks 104 within the hardware queues 108, and store the scripts 105 corresponding to the tasks 104 within the memory 106. The client management component 110 retrieves the tasks 104 from the hardware queues 108, and sends them to the monitor component 112, which sends the tasks 104 to the hardware resource management component 114. The hardware resource management component retrieves the scripts 105 from the memory 106, and executes the scripts 105 for fulfillment by the hardware resources 116. The hardware resources 116 generate interrupts 118 when they have completed the tasks 104. The monitor component 112 receives the interrupts 118, and notifies the clients 102 that generated the tasks 104.

The process that has been described in relation to the system 100 continually occurs as the clients 102 generate the tasks 104, and as the hardware resources 116 fulfill the tasks 104. The hardware resource management component 114 continually notifies the monitor component 112 when it is available to receive another task 104 for completion by the hardware resources 116. This notification is based on availability information continually sent by the hardware resources 116 to the hardware resource management component 114. The hardware resource management component 114 thus notifies the monitor component 112 when the hardware resources 116 are available to complete another task 104.

The monitor component 112 in turn continually notifies the client management component 110 when it is available to receive another task 104 to send to the hardware resource management component 114 for completion or fulfillment by the hardware resources 116. That is, the monitor component 112, upon receiving notification from the hardware resource management component 114 that the hardware resources 116 are available to complete or fulfill another task, requests that the client management component 110 choose another client 102 for which another task is to be completed. As such, the client management component 110 when so notified chooses a selected client 102 that has an outstanding task 104 placed within the corresponding queue 108. The client management component 110 then retrieves and removes this task 104 from the corresponding queue 108, and sends it to the monitor component 112.

As the clients 102 generate the tasks 104, the clients 102 place the tasks 104 within the queue 108, and store the scripts 105 corresponding to the tasks 104 within the memory 106 (or otherwise reference the scripts 105, where the scripts 105 are preexisting). If the queue 108 for a client 102 is full, the client 102 has to wait before placing an additional task 104 within the queue 108. The client management component 110 may be communicatively coupled to each client 102 directly, in addition to indirectly via the queues 108.

Each of the components 110, 112, and 114 is a discrete hardware component. Furthermore, each of the components 110, 112, and 114 can be said to correspond to a means that performs the functionality of the component in question. For instance, the client management component 110 can implement means for choosing a selected client 102 for which a task is to be fulfilled next by a selected hardware resource 116, among other functionality. The monitor component 112 can implement means for receiving the tasks 104 from the client management component 110 and for monitoring completion of the tasks 104 for the clients 102 by the hardware resources 116, among other functionality. The hardware resource management component 114 can implement means for receiving the task generated by the selected client 102, for choosing the selected hardware resource 116 in relation to which this task is to be completed (i.e., that is to fulfill this task), and for launching the task on the selected hardware resource 116, among other functionality.

FIGS. 2A and 2B show an example method 200 that can be performed in relation to the example system 100. FIGS. 2A and 2B are each divided into five columns, corresponding to a selected client 102, the client management component 110, the monitor component 112, the hardware resource management component 114, and a selected hardware resource 116. Parts of the method 200 in a given column are performed by the selected client 102, the component 110, 112, or 114, or the selected hardware resource 116 to which the given column corresponds.

The selected client 102 generates a task 104 (202). This can include generating and storing a corresponding script 105 within the memory 106, and storing the task 104 within the corresponding queue 108. Generating a task can also include referring to an existing script 105 within the memory 106, and storing the task 104 within the corresponding queue 108. The task 104 includes a pointer to the script 105 within the memory 106, and also an identifier of the selected client 102.

The client management component 110 chooses the selected client 102 from the clients 102 (204), as the client 102 for which a task 104 is to be completed next by the hardware resources 116. The client management component 110 removes the task 104 from the queue 108 (206), which the selected client 102 previously stored within the queue 108, and sends the task 104, including the identifier of the selected client 102, to the monitor component 112 (208). The monitor component 112 in turn receives the task 104 (210).

The monitor component 112 sends the task 104, such as just the pointer to the script 105 within the memory 106, to the hardware resource management component 114 (212). The hardware resource management component 114 in turn receives the task 104, such as just the pointer to the script 105 within the memory 106 (214). The hardware resource management component 114 chooses the selected hardware resource 116 from the hardware resources 116 (215), as the hardware resource 116 that is to fulfill the task 104 (i.e., the script 105 corresponding to this task 104).

The hardware resource management component 114 launches the task 104 (i.e., the corresponding script 105) on the selected hardware resource 116 (216). For instance, the hardware resource management component 114 may retrieve the script 105 from the memory 106, as pointed to by the task 104, and execute the script 105 in relation to the selected hardware resource 116. The selected hardware resource 116 then performs processing to complete the task 104 (218).

When the task 104 is completed, the selected hardware resource 116 generates an interrupt 118 (220). The monitor component 112 receives this interrupt 118 (22). That is, the monitor component 112 monitors completion of the task 104 for the selected client 102. The monitor component 112 in turn notifies the selected client 102 that its task 104 has been completed (224), and the selected client 102 receives this notification from the monitor component 112 (226).

At some point, the hardware resource management component 114 may notify the monitor component 112 that one or more of the hardware resources 106 are available to complete another task 104 (228). The monitor component 112 receives this notification (230), and requests that the client management component 110 select another client 102 for which another task 104 is to be completed (232). The client management component 110 receives this request (234), and the method 200 is repeated at part 204.

The method 200 has been described as a sequential process. However, in actuality, parts of the method 200 are performed in parallel with one another, due to the fact that there are multiple clients 102 generating tasks 104, and multiple hardware resources 116 that are fulfilling the tasks 104. As the hardware resources 116 become available, notification of this fact is sent from the hardware resource management component 114 to the monitor component 112. The monitor component 112 in turn requests the client management component 110 to select clients 102 for which the tasks 104 can then be completed or fulfilled by the available hardware resources 116. Furthermore, as the hardware resources 116 complete the tasks 104 and generate the interrupts 118, the monitor component 112 receives these interrupts 118 and correspondingly notifies the clients 102.

The system 100 that has been described can be implemented in relation to and/or within a hardware device. The hardware device may be an image-forming device, such as a printing device, or another type of device, such as a computing device like a general-purpose computer, among other types of hardware devices. For example, the hardware device may be a color printing device that forms images on media like paper in full color.

The printing device may have a number of different colorants, such as cyan, magenta, yellow, and black. Color processing is performed to convert full color image data to each such color, and the colorant of each color is output onto the media separately by one or more print engines. For a given portion of the image data, such as a given line thereof, the different colorants may be output onto the media at different times.

As a part of the color conversion process, relatively large amounts of data have to be copied. To facilitate this process, there are hardware resources 116 dedicated to performing copying. Such hardware resources 116 may be referred to as copy blocks. Conventionally, there may be four copy blocks, one for each color of colorant, and thus one for each client 102, where each client 102 is responsible for a different color of colorant. However, more of one type of color data may have to be copied than another type of color data. As such, one copy block may be working for an excessively long time, while the other copy blocks may not be working at all.

The techniques disclosed herein thus permit the four copy blocks—or other number of copy blocks—to be shared among the clients 702. When a copy block is finished, it can signal this information to the monitor component 112 by asserting an interrupt 118. The monitor component 112 then signals task completion to the appropriate client 102. If the hardware resource management component 114 has signaled to the monitor component 112 that the hardware resources 116 can fulfill another task 106, then the monitor component 112 can request that the client management component 110 select another client 102 from which a task 104 is to be completed. As such, there is no direct connection between the hardware resources 116 and the clients 102, and at least in theory any client 102 may have a tasks 104 fulfilled by any hardware resource 116.

We claim:

1. A system comprising:
   a processor;
   a client management hardware component to choose a selected client from a plurality of clients, the selected client for which a given task is to be fulfilled by a selected hardware resource of one or more hardware resources;
   a monitor hardware component different from and separate than the client management hardware component to receive the given task and an identifier of the selected client from the client management hardware component and to monitor completion of the given task for the selected client by the selected hardware resource by trapping an interrupt generated by the selected hardware resource upon completion of the given task and responsively informing the selected client that the given task has been completed;
   a hardware resource management hardware component different from and separate than the monitor hardware component and the client management component to receive the given task from the monitor hardware component, to choose the selected hardware resource that is to fulfill the given task, and to launch the given task on the selected hardware resource;

a memory storing a plurality of scripts; and a plurality of queues corresponding to the clients and in which the clients place tasks, including the given task, for completion by the hardware resources, each task identifying a pointer to a script within the memory, wherein the hardware resource management hardware component is to look up the script to which the pointer of the given task references within the memory and cause the selected hardware resource to perform the script to which the pointer of the given task references.

2. The system of claim 1, wherein one or more of:

the one or more clients comprise a plurality of clients;

the one or more hardware resources comprise a plurality of hardware resources.

3. The system of claim 1, wherein the hardware resource management hardware component is to notify the monitor hardware component that the one or more hardware resources are available to complete another task.

4. The system of claim 3, wherein the monitor hardware component is to, upon receiving notification from the hardware resource management hardware component that the another task can be completed, request that the client management hardware component choose a new selected client from the one or more clients for which the another task is to be completed.

5. The system of claim 1, further comprising the plurality of queues external to the client management hardware component, the monitor hardware component, and the hardware resource management component, the plurality of queues corresponding to the one or more clients, wherein each client is to place tasks within a corresponding queue of the plurality of queues, and the client management hardware component is to remove the given task from the plurality of queues.

6. The system of claim 1, further comprising one or more of:

the one or more hardware resources;

the one or more clients.

7. A method comprising:

choosing, by a client management hardware component, a selected client from a plurality of clients, the selected client for which a given task is to be fulfilled by a selected hardware resource of one or more hardware resources;

receiving, by a monitor hardware component different from and separate than the client management hardware component, the given task and an identifier of the selected client from the client management hardware component;

receiving, by a hardware resource management hardware component different from and separate than the client management hardware component and the monitor hardware component, the given task from the monitor hardware component;

choosing, by the hardware resource management hardware component, the selected hardware resource that is to fulfill the given task;

launching, by the hardware resource management hardware component, the given task on the selected hardware resource, by looking up a script within a memory to which a pointer of the given task references and causing the selected hardware resource to perform the script; and monitoring, by the monitor hardware component, completion of the given task for the selected client by the selected hardware resource, by:

trapping an interrupt generated by the selected hardware resource upon completion of the given task; and responsively informing the selected client that the given task has been completed.

8. The method of claim 7, further comprising:

notifying the monitor hardware component, by the hardware resource management hardware component, that the one or more hardware resources are available to complete another task;

upon receiving notification that the another task can be completed, requesting, by the monitor hardware component, that the client management choose a new selected client from the one or more clients for which the another task is to be completed.

9. The method of claim 7, further comprising:

retrieving, from the queue corresponding to the selected client, the given task in which the selected client has placed the given task.

10. A system comprising:

a memory storing a plurality of scripts;

a plurality of queues corresponding to a plurality of clients and in which the clients place tasks for completion by a plurality of hardware resources, each task identifying a pointer to a script within the memory;

a client management hardware component to:

select a given task generated by a given client from the queues for completion by a given hardware resource; and transmit the given task;

a monitor hardware component to:

receive and retransmit the given task as transmitted by the client management hardware component;

trap an interrupt generated by the given hardware resource upon completion of the given task and responsively inform the given client that the given task has been completed; and notify the client management hardware component when another task is to be selected from the queues for completion;

a hardware resource management component to receive the given task as retransmitted by the monitor hardware component and select the given hardware resource to perform the given task;

look up the script to which the pointer of the given task references within the memory and cause the given hardware resource to perform the script to which the pointer of the given task references; and notify the monitor hardware component when the hardware resources are available, on which basis the monitor hardware component is to notify the client management hardware component that the another task is to be selected from the queues for completion.

* * * * *